United States Patent
Arikawa et al.

[11] Patent Number: 6,002,566
[45] Date of Patent: Dec. 14, 1999

[54] RESETTABLE OVERCURRENT PROTECTIVE CIRCUIT

[75] Inventors: Hiroo Arikawa, Tokyo; Masaya Maruo, Hyogo-ken, both of Japan

[73] Assignee: SOC Corporation, Tokyo, Japan

[21] Appl. No.: 09/116,224

[22] Filed: Jul. 16, 1998

[30] Foreign Application Priority Data

Jul. 22, 1997 [JP] Japan .................................. 9-211305

[51] Int. Cl.⁶ .................................................. H02H 3/00
[52] U.S. Cl. ......................... 361/93.1; 361/58; 361/100; 361/115
[58] Field of Search ............... 361/56, 58, 100, 361/93, 115, 18, 23, 93.1

[56] References Cited

U.S. PATENT DOCUMENTS

| | | | |
|---|---|---|---|
| 3,992,650 | 11/1976 | Iwasa et al. | 317/33 R |
| 4,533,970 | 8/1985 | Brown | 361/58 |
| 5,115,369 | 5/1992 | Robb et al. | 361/93 |
| 5,319,515 | 6/1994 | Pryor et al. | 361/93 |

FOREIGN PATENT DOCUMENTS

| | | | |
|---|---|---|---|
| 0 684 677 | 11/1995 | European Pat. Off. | H02H 7/20 |
| 57-9291 | 2/1982 | Japan | H02H 3/087 |
| 58-139624 | 8/1983 | Japan | H02H 3/087 |
| 3-48456 | 3/1991 | Japan | H01L 27/06 |
| 3-53613 | 3/1991 | Japan | H03K 17/08 |
| 3-65020 | 3/1991 | Japan | H02H 9/02 |
| 3-86013 | 4/1991 | Japan | H02H 3/08 |
| 3-145918 | 6/1991 | Japan | H02H 3/08 |
| 4-120740 | 4/1992 | Japan | H01L 21/338 |
| 5-13681 | 1/1993 | Japan | H02L 7/12 |
| 5-49154 | 2/1993 | Japan | H02H 3/087 |
| 5-83843 | 4/1993 | Japan | H02H 3/08 |
| 5-167021 | 7/1993 | Japan | H01L 27/06 |
| 5-275704 | 10/1993 | Japan | H01L 29/784 |
| 5-300637 | 11/1993 | Japan | H02H 3/087 |
| 6-21345 | 1/1994 | Japan | H01L 27/04 |
| 6-90000 | 3/1994 | Japan | H01L 29/784 |
| 6-276659 | 9/1994 | Japan | H02H 3/087 |
| 6-351151 | 12/1994 | Japan | H02H 3/087 |
| 7-236227 | 9/1995 | Japan | H02H 9/02 |
| 94/18736 | 8/1994 | WIPO | H02H 3/08 |
| 96/14684 | 5/1996 | WIPO | H02H 9/02 |

*Primary Examiner*—Jeffrey Gaffin
*Assistant Examiner*—Stephen W. Jackson
*Attorney, Agent, or Firm*—Wenderoth, Lind & Ponack, L.L.P.

[57] ABSTRACT

An overcurrent protective circuit includes a N-type depletion mode FET, a P-type depletion mode FET, and a switch. The sources of the N-type depletion mode FET and the P-type depletion mode FET are connected to each other. The gate of the N-type depletion mode FET is connected through a resistor to the drain of the P-type depletion mode FET. The gate of the P-type depletion mode FET is connected through a resistor to the drain of the N-type depletion mode FET. The drain of the N-type depletion mode FET is a positive external terminal of the circuit, while the drain of P-type depletion mode FET is a negative external terminal of the circuit. A switch electrically connects and disconnects between the gate of the N-type depletion mode FET and the gate of the P-type depletion mode FET.

12 Claims, 3 Drawing Sheets

RESETTABLE OVERCURRENT PROTECTIVE CIRCUIT

BACKGROUND OF THE INVENTION

The present invention relates to a resettable overcurrent protective circuit which cuts off an overcurrent to protect a load circuit when an overcurrent flows therethrough.

A breaker cannot interrupt an overcurrent very quickly due to its mechanical operation. Therefore, there has been a problem that a breaker cannot be used in a circuit which requires a rapid cut-off operation such as an IC semiconductor circuit. Also, there has been another problem that a breaker requires a mechanical operation to be reset.

In Japanese Patent Unexamined Publication Nos. 3-48456 and 5-167021, and PCT Publication No. WO 94/18736, an overcurrent protective circuit is disclosed which is connected in series between a power source and a load circuit, and in which the sources of an N-type depletion mode FET and a P-type depletion mode FET are connected to each other, the drain of the N-type depletion mode FET is a positive terminal, and the drain of the P-type depletion mode FET is a negative terminal. The disclosed overcurrent protective circuits operate to cut off an overcurrent to protect a load circuit when the overcurrent flows therethrough. In the case that, subsequently, the overcurrent returns to a normal level, it is, however, necessary to use a troublesome operation of disconnecting the overcurrent protective circuits from the power source in order to restore them from the cut-off state to the normal current-carrying state.

SUMMARY OF THE INVENTION

An object of the present invention is to provide an overcurrent protective circuit capable of rapidly cutting off an overcurrent and being easily reset.

This object is achieved by an overcurrent protective circuit comprising a N-type depletion mode field effect transistor (FET) having an drain that is a positive external terminal of the circuit, a source, and a gate; a P-type depletion mode FET having a drain that is a negative external terminal of the circuit, a source, and a gate; and a switching means for electrically connecting and disconnecting between the gate of the N-type depletion mode FET and the gate of the P-type depletion mode FET. The sources of the N-type depletion mode FET and the P-type depletion mode FET are connected to each other. The gate of the N-type depletion mode FET is connected through a resistor to the drain of the P-type depletion mode FET. The gate of the P-type depletion mode FET is connected through a resistor to the drain of the N-type depletion mode FET.

The overcurrent protective circuit of the present invention can return from the cut-off state to the current-carrying state by electrically connecting and disconnecting between the gate of the N-type depletion mode FET and the gate of the P-type depletion mode FET by means of the switching means. If the overcurrent protective circuit is in the cut-off state again after the gate of the N-type depletion mode FET and the gate of the P-type depletion mode FET are electrically connected and disconnected to each other by the switching means, a circuit including a load to be protected and a power source can be assumed to still be in an abnormal condition. Hence, the present invention can provide an overcurrent protective circuit having a diagnostic function to find out whether the condition of a whole circuit including a load is normal or abnormal.

The above-mentioned and other objects and features of the present invention will be apparent from the following explanation taken in accordance with the accompanying drawings and novel aspects pointed out in the appended claims.

DETAILED DESCRIPTION OF THE INVENTION

A first embodiment of the present invention will be explained with reference to FIG. 1.

Figure 1:
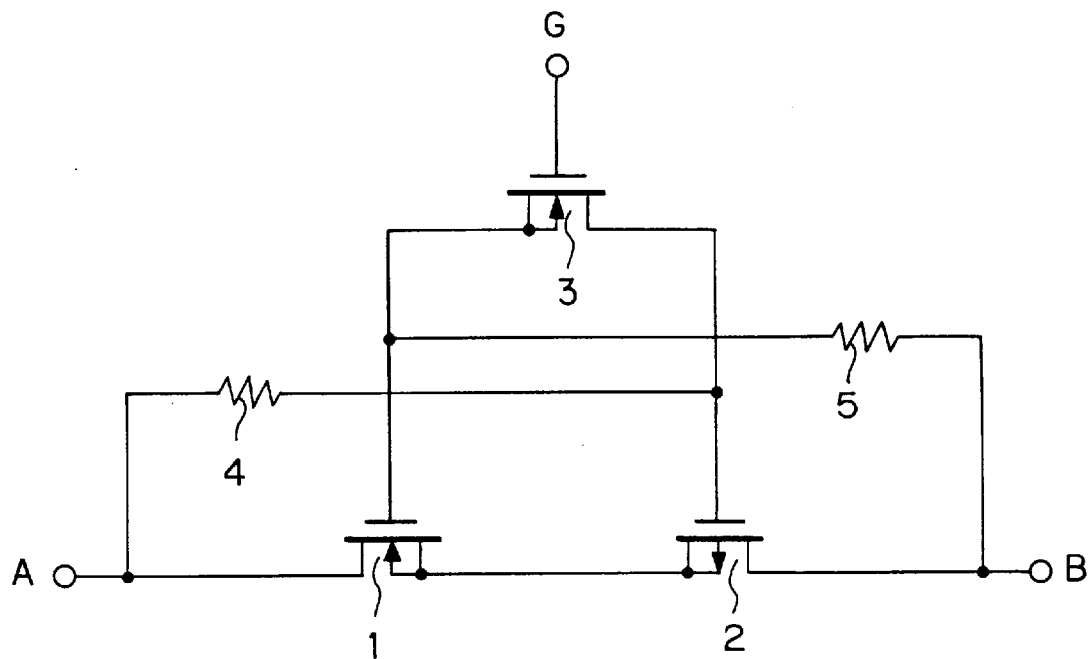
FIG. 1 is a circuit diagram showing a first embodiment of a resettable overcurrent protective circuit according to the present invention.

In FIG. 1, there is shown an overcurrent protective circuit device according to the first embodiment of the present invention. The overcurrent protective circuit device comprises an N-type depletion mode MOS FET (hereinafter referred to as N-type DMOS FET) 1, a P-type depletion mode MOS FET (hereinafter referred to as P-type DMOS FET) 2, a N-type MOS FET 3, and two resistors 4 and 5. As shown in FIG. 1, the sources of the N-type DMOS FET 1 and the P-type DMOS FET 2 are connected to each other. The gate of the N-type DMOS FET 1 is connected to a resistor 5. The terminal of the resistor 5 which is not connected to the N-type DMOS FET 1 is connected to the drain of the P-type DMOS FET 2. The gate of the P-type DMOS FET 2 is connected to a resistor 4. The terminal of the resistor 4 which is not connected to the P-type DMOS FET 2 is connected to the drain of the N-type DMOS FET 1. The source of a N-type MOS FET 3 is connected to the gate of the N-type DMOS FET 1. The drain of the N-type MOS FET 3 is connected to the gate of the P-type DMOS FET 2. The drain of the N-type DMOS FET 1 is a positive terminal A, the drain of the P-type DMOS FET 2 is a negative terminal B, and the gate of the N-type MOS FET 3 is an input terminal for a reset signal.

The function of each part will be explained below.

According to the connection mentioned above, when a voltage VAB is applied across the external terminal A with positive potential and the external terminal B with negative potential, the potential difference in the P-type DMOS FET 2 (that is the potential difference between the source and the drain of the P-type DMOS FET 2) becomes the gate voltage of the N-type DMOS FET 1 (that is the potential difference between the source and the gate of the N-type DMOS FET 1), while the potential difference in the N-type DMOS FET 1 becomes the gate voltage of the P-type DMOS FET 2 (that is the potential difference between the source and the gate of the P-type DMOS FET 2).

Therefore, when the voltage VAB increases gradually, then the current IAB to flow through the N-type DMOS FET 1 and the P-type DMOS FET 2 increases gradually. However, as the potential difference in the N-type DMOS FET 1 increases, the gate voltage of the P-type DMOS FET 2 increases, and also as the potential difference in the P-type DMOS FET 2 increases, the gate voltage of the N-type DMOS FET 1 increases. Thereby, when the voltage VAB increases to grow the current IAB, then the potential differences of the N-type DMOS FET 1 and the P-type DMOS FET 2 increase to grow the gate voltages of the N-type DMOS FET 1 and the P-type DMOS FET 2.

As the voltage VAB increases, the current IAB further increased, and the potential differences in the N-type DMOS FET 1 and the P-type DMOS FET 2 will be correspondingly increased. So the gate voltages of the N-type DMOS FET 1 and the P-type DMOS FET 2 become higher. Accordingly, when the current IAB reaches a certain value which corresponds to an operation point of protection defined in advance in the circuit design, the N-type DMOS FET 1 and the P-type DMOS FET 2 come to prevent the current IAB from increasing and then reduce the current IAB. After that, the N-type DMOS FET 1 and the P-type DMOS FET 2 reaching to a pinch-off state make the current IAB (overcurrent) be cut off.

The current IAB can flow to some extent in this way, but when the current IAB more than the extent flows, N-type DMOS FET 1 and the P-type DMOS FET 2 cut off the current IAB (overcurrent), thus operating as an overcurrent protector.

Figure 2:
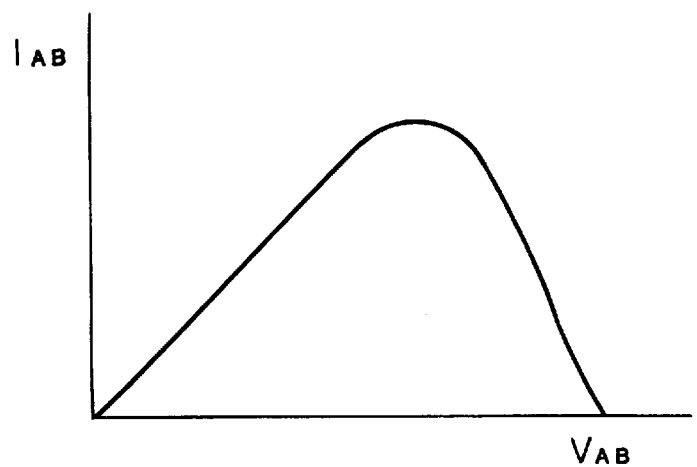
FIG. 2 illustrates a cut-off static characteristic of the overcurrent protective circuit.

The cut-off static characteristic of the overcurrent protective circuit device is shown in FIG. 2.

Next, the reset function by the N-type MOS FET 3 connected between the gates of the N-type DMOS FET 1 and the P-type DMOS FET 2 will be explained. Usually, a gate voltage which brings the N-type MOS FET 3 into a cut-off state is applied to the terminal G.

In the case that the overcurrent protective circuit device cuts off an overcurrent caused by a transient over-voltage applied between terminals A and B, after the transient over-voltage disappeared and the voltage became normal, a voltage to make the N-type MOS FET 3 be in the conduction state is applied to the terminal G for a short time, whereby the N-type MOS FET 3 is brought into the conduction state. This conduction causes the gate voltages of the N-type DMOS FET 1 and the P-type DMOS FET 2 to have approximately the same potential as each other, whereby the N-type DMOS FET 1 and the P-type DMOS FET 2 return to the conduction state, and hence they are able to carry a normal current again.

The N-type MOS FET 3 may be either one of depletion mode or enhancement mode, and also it may be replaced with a P-type MOS FET.

If the resistors 4 and 5 have high resistances, the gate voltages of the N-type DMOS FET 1 and the P-type DMOS FET 2 can be caused to be approximately at the same potential to each other when the gates of the N-type DMOS FET 1 and the P-type DMOS FET 2 are connected to each other by the N-type MOS 3 which has a low resistance when it becomes in the conduction state. Accordingly, regarding the device which connects between the gates of the N-type DMOS FET 1 and the P-type DMOS FET 2, a bipolar transistor, a thyristor (SCR), a photodiode, a phototransistor, or any other device having a low resistance in its conduction state may be used instead of the MOS FET.

A second embodiment of the present invention using a bipolar transistor will be explained with FIG. 3.

Figure 3:
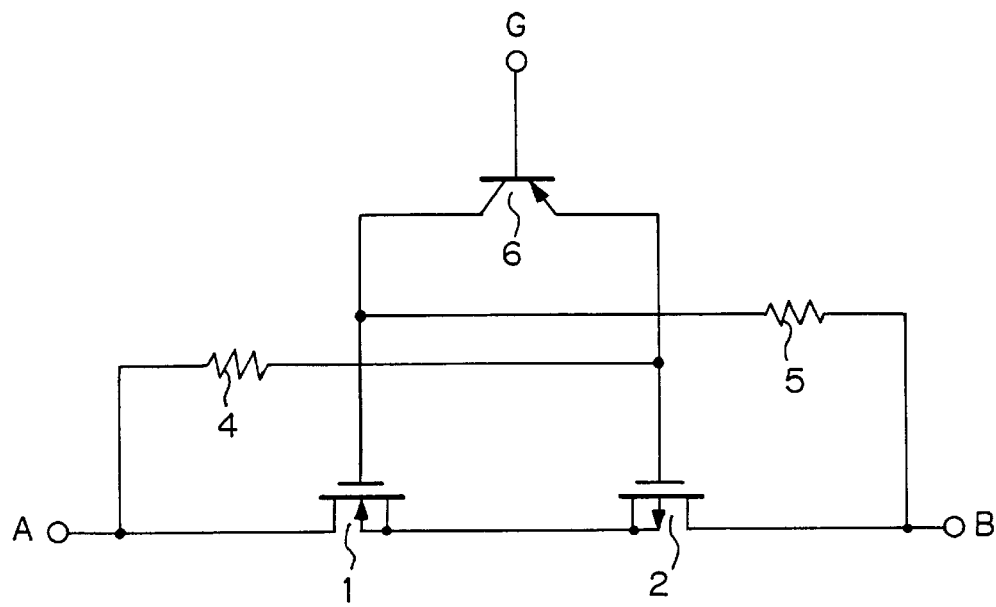
FIG. 3 is a circuit diagram showing a second embodiment of a resettable overcurrent protective circuit according to the present invention.

The embodiment shown in FIG. 3 is made by replacing the N-type MOS FET 3 in the embodiment shown in FIG. 1 with a bipolar transistor. Accordingly, explanation pertaining to a part of the circuit shown in FIG. 3 which is the same as that for the circuit shown in FIG. 1 is omitted.

The collector of the bipolar transistor 6 is connected to the gate of the N-type DMOS FET 1. The emitter of the bipolar transistor 6 is connected to the gate of the P-type DMOS FET 2. The drain of the N-type DMOS FET 1 is a positive external terminal A, the drain of the P-type DMOS FET 2 is a negative external terminal B, and the base of the bipolar transistor 6 is an input terminal G for a reset signal.

Usually, a voltage which brings the bipolar transistor 6 into a cut-off state is applied to the terminal G.

In the case that the overcurrent protective circuit device cuts off an overcurrent caused by a transient over-voltage applied between terminals A and B, after the transient over-voltage disappeared and the voltage became normal, a voltage to make the bipolar transistor 6 be in the conduction state is applied to the terminal G for a short time, whereby the bipolar transistor 6 is brought into a conduction state. This conduction causes the gate voltages of the N-type DMOS FET 1 and the P-type DMOS FET 2 to have approximately the same potential as each other, whereby the N-type DMOS FET 1 and the P-type DMOS FET 2 return to the conduction state, and hence they are able to carry a normal current again.

A third embodiment of the present invention using a thyristor will be explained with FIG. 4.

Figure 4:
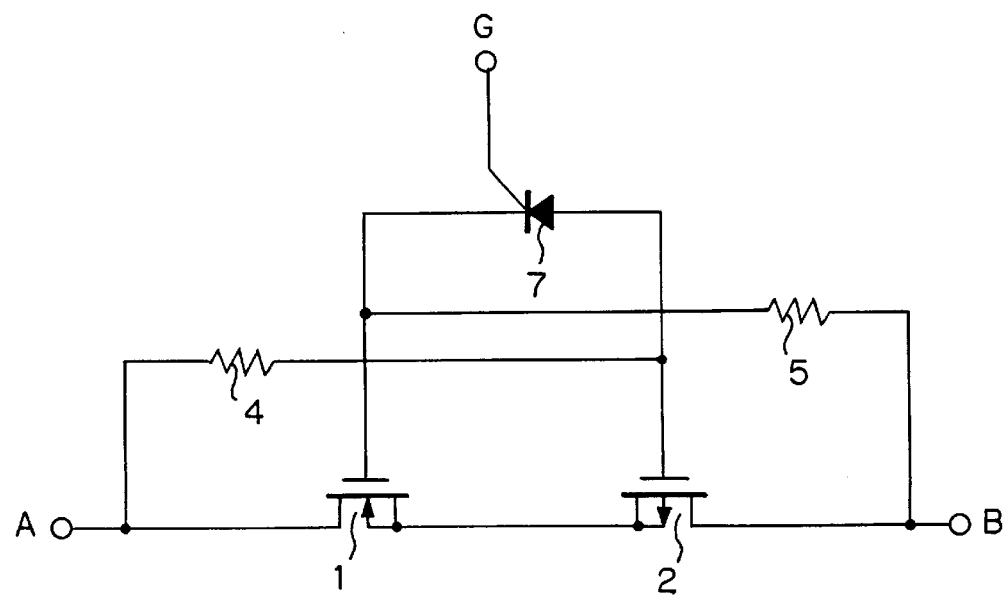
FIG. 4 is a circuit diagram showing a third embodiment of a resettable overcurrent protective circuit according to the present invention.

The embodiment shown in FIG. 4 is made by replacing the N-type MOS FET 3 in the embodiment shown in FIG. 1 with a thyristor. Accordingly, explanation pertaining to a part of the circuit shown in FIG. 4 which is the same as that for the circuit shown in FIG. 1 is omitted.

The cathode of the thyristor 7 is connected to the gate of the N-type DMOS FET 1. The anode of a thyristor 7 is connected to the gate of the P-type DMOS FET 2. The drain of the N-type DMOS FET 1 is a positive external terminal A, the drain of the P-type DMOS FET 2 is a negative external terminal B, and the gate of the thyristor 7 is an input terminal G for a reset signal.

Usually, a voltage which brings the thyristor 7 into a cut-off state is applied to the terminal G.

In the case that the overcurrent protective circuit device cuts off an overcurrent caused by a transient over-voltage applied between terminals A and B, after the transient over-voltage disappeared and the voltage became normal, a voltage to make the thyristor 7 be in the conduction state is applied to the terminal G for a short time, whereby the thyristor 7 is brought into a conduction state. This conduction causes the gate voltages of the N-type DMOS FET 1 and the P-type DMOS FET 2 to have approximately the same potential as each other, whereby the N-type DMOS FET 1 and the P-type DMOS FET 2 return to the conduction state, and hence they are able to carry the normal current again.

Figure 5:
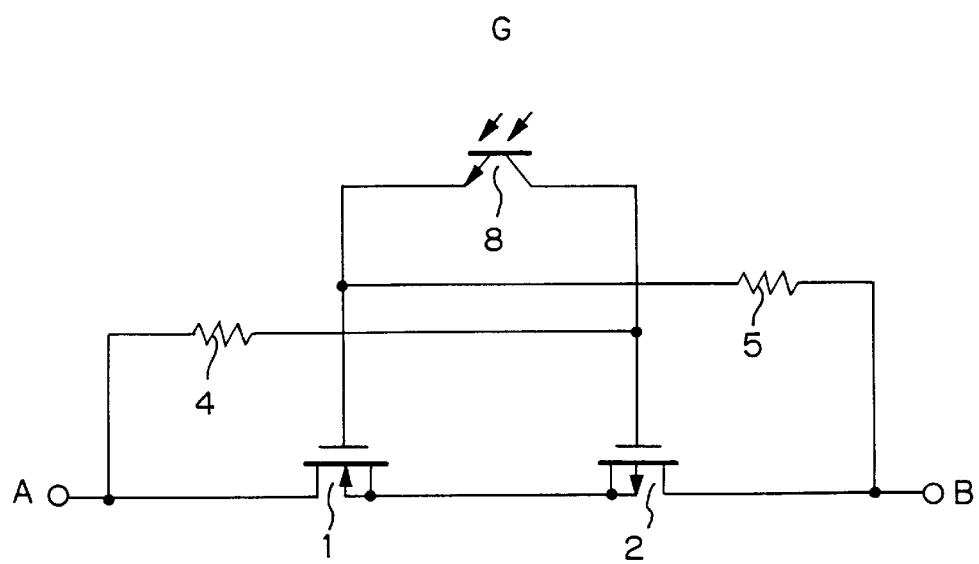
FIG. 5 is a circuit diagram showing a fourth embodiment of a resettable overcurrent protective circuit according to the present invention.

A fourth embodiment of the present invention using a phototransistor is explained with FIG. 5.

The embodiment shown in FIG. 5 is made by replacing the N-type MOS FET 3 in the embodiment shown in FIG. 1 with a phototransistor. Accordingly, explanation pertaining to a part of the circuit shown in FIG. 5 which is the same as that for the circuit shown in FIG. 1 is omitted.

The emitter of a phototransistor 8 is connected to the gate of the N-type DMOS FET 1. The collector of the phototransistor 8 is connected to the gate of the P-type DMOS FET 2. The drain of the N-type DMOS FET 1 is a positive external terminal A, the drain of the P-type DMOS FET 2 is a negative external terminal B, and the base of the phototransistor 8 is an input terminal G for an optical reset signal.

Usually, the base of the phototransistor 8 is not exposed to any light whereby the phototransistor 8 remains in the cut-off state.

In the case that the overcurrent protective circuit device cuts off an overcurrent caused by a transient over-voltage applied between terminals A and B, after the transient over-voltage disappeared and the voltage became normal, the terminal G is exposed to a certain amount of light for a short time so that the phototransistor 8 is brought into a conduction state. This conduction causes the gate voltages of the N-type DMOS FET 1 and the P-type DMOS FET 2 to have approximately the same potential as each other, whereby the N-type DMOS FET 1 and the P-type DMOS FET 2 return to the conduction state, and hence they are able to carry a normal current again.

In the embodiments mentioned above, the overcurrent protective circuit devices of the present invention can return from the cut-off state to the current-carrying state by applying a pulse voltage making the N-type MOS FET 3, the bipolar transistor 6, or the thyristor 7 be in the conduction state to the terminal G for a moment, or by exposing the terminal G for a moment to a light making the phototransistor 8 be in the conduction state. If the overcurrent protective circuit devices are in the cut-off state again after the gate of the N-type DMOS FET 1 and the gate of the P-type DMOS FET 2 have been electrically connected to each other by the N-type MOS FET 3, the bipolar transistor 6, the thyristor 7, or the phototransistor 8, a circuit including a load to be protected and a power source can be assumed to be still in an abnormal condition. Hence, the resettable overcurrent protective circuit devices have a self-diagnostic function. The resettable overcurrent protective circuit devices can also cut off an overcurrent quickly (from several microseconds to scores of milliseconds) depending upon a load circuit to be protected, and can be reset with a small electrical signal (several mA, approximately 1 millisecond).

The type of elements indicated by reference numerals 1 and 2 in the embodiments described above is a DMOS FET, but is not limited to it and may be any other type of FET such as an insulated gate FET and a junction type FET.

The invention has been described in detail with particular reference to certain preferred embodiments thereof, but it will be understood that variations and modifications can be effected within the spirit and scope of the invention.

What is claimed is:

1. An overcurrent protective circuit comprising:
    a N-type depletion mode field effect transistor (FET) having a drain, a source, and a gate, wherein said drain of said N-type depletion mode FET is a positive external terminal of said overcurrent protective circuit;
    a P-type depletion mode FET having a drain, a source, and a gate, wherein said drain of said P-type depletion mode FET is a negative external terminal of said overcurrent protective circuit; and
    a switching means for electrically connecting and disconnecting said gate of said N-type depletion mode FET and said gate of said P-type depletion mode FET;
    wherein said sources of said N-type depletion mode FET and said P-type depletion mode FET are connected to each other, said gate of said N-type depletion mode FET is connected through a resistor to said drain of said P-type depletion mode FET, and said gate of said P-type depletion mode FET is connected through a resistor to said drain of said N-type depletion mode FET.

2. An overcurrent protective circuit as claimed in claim 1, wherein said switching means is a transistor.

3. An overcurrent protective circuit as claimed in claim 1, wherein:
    said transistor is an additional field effect transistor (FET) having a gate, a source, and a drain, and said gate of said additional FET is an input terminal for a reset signal;
    one of said source and said drain of said additional FET is connected to said gate of said N-type depletion mode FET; and
    the other of said source and said drain of said additional FET is connected to said gate of said P-type depletion mode.

4. An overcurrent protective circuit as claimed in claim 2, wherein:
    said transistor is a bipolar transistor having a base, an emitter, and a collector, and said base of said bipolar transistor is an input terminal for a reset signal;
    one of said collector and said emitter of said bipolar transistor is connected to said gate of said N-type depletion mode FET; and
    the other of said collector and said emitter of said bipolar transistor is connected to said gate of said P-type depletion mode FET.

5. An overcurrent protective circuit as claimed in claim 2, wherein:
    said transistor is a phototransistor having a base, an emitter, and a collector, and said base of said phototransistor is an input terminal for an optical reset signal;
    said emitter of said phototransistor is connected to said gate of said N-type depletion mode FET; and
    said collector of said phototransistor is connected to said gate of said P-type depletion mode FET.

6. An overcurrent protective circuit as claimed in claim 1, wherein:
    said switching means is a thyristor having a gate, an anode, and a cathode, and said gate of said thyristor is an input terminal for a reset signal;
    said cathode of said thyristor is connected to said gate of said N-type depletion mode FET; and
    said anode of said thyristor is connected to said gate of said P-type depletion mode FET.

7. An overcurrent protective circuit as claimed in claim 1, wherein said depletion mode FETs are depletion mode MOS transistors.

8. An overcurrent protective circuit as claimed in claim 7, wherein said switching means is a transistor.

9. An overcurrent protective circuit as claimed in claim 8, wherein:
    said transistor is an additional field effect transistor (FET) having a gate, a source, and a drain, and said gate of said additional FET is an input terminal for a reset signal;
    one of said source and said drain of said additional FET is connected to said gate of said N-type depletion mode MOS transistor; and
    the other of said source and said drain of said additional FET is connected to said gate of said P-type depletion mode MOS transistor.

10. An overcurrent protective circuit as claimed in claim 8, wherein:
    said transistor is a bipolar transistor having a base, an emitter, and a collector, and said base of said bipolar transistor is an input terminal for a reset signal;

one of said collector and said emitter of said bipolar transistor is connected to said gate of said N-type depletion mode MOS transistor; and the other of said collector and said emitter of said bipolar transistor is connected to said gate of said P-type depletion mode MOS transistor.

11. An overcurrent protective circuit as claimed in claim 8, wherein:

said transistor is a phototransistor having a base, an emitter, and a collector, and said base of said phototransistor is an input terminal for an optical reset signal;

said emitter of said phototransistor is connected to said gate of said N-type depletion mode MOS transistor; and said collector of said phototransistor is connected to said gate of said P-type depletion mode MOS transistor.

12. An overcurrent protective circuit as claimed in claim 7, wherein:

said switching means is a thyristor having a gate, an anode, and a cathode, and said gate of said thyristor is an input terminal for a reset signal;

said cathode of said thyristor is connected to said gate of said N-type depletion mode MOS transistor; and said anode of said thyristor is connected to said gate of said P-type depletion mode MOS transistor.

* * * * *